(12) United States Patent
Simpfendorfer et al.

(10) Patent No.: US 11,766,798 B2
(45) Date of Patent: Sep. 26, 2023

(54) CUTTER CAPABLE OF CUTTING AWAY OBSTRUCTIONS DISPOSED ON THE INSIDES OF PIPES RANGING IN DIAMETER FROM APPROXIMATELY EIGHT INCHES TO APPROXIMATELY FIFTEEN INCHES OR FROM APPROXIMATELY TWELVE INCHES TO APPROXIMATELY TWENTY-FOUR INCHES

(71) Applicant: USB-USA, LLC, Douglasville, GA (US)

(72) Inventors: Ulrich Simpfendorfer, Douglasville, GA (US); Simon Simpfendorfer, Douglasville, GA (US); Martin Hurlebaus, Douglasville, GA (US); Manuel Schwab, Douglasville, GA (US)

(73) Assignee: USB-USA, LLC, Dougllasville, GA (US)

( * ) Notice: Subject to any disclaimer, the term of this patent is extended or adjusted under 35 U.S.C. 154(b) by 0 days.

(21) Appl. No.: 16/795,962

(22) Filed: Feb. 20, 2020

(65) Prior Publication Data
US 2020/0262094 A1 Aug. 20, 2020

Related U.S. Application Data

(60) Provisional application No. 62/808,142, filed on Feb. 20, 2019.

(51) Int. Cl.
*B26D 3/16* (2006.01)
*B26D 1/28* (2006.01)
*B26D 1/00* (2006.01)
*F16L 55/44* (2006.01)
*F16L 101/10* (2006.01)

(52) U.S. Cl.
CPC ............... *B26D 3/163* (2013.01); *B26D 1/28* (2013.01); *B26D 1/0006* (2013.01); *B26D 2001/0046* (2013.01); *F16L 55/44* (2013.01); *F16L 2101/10* (2013.01)

(58) Field of Classification Search
CPC ........ B26D 3/163; B26D 1/28; B26D 1/0006; B26D 2001/0046; F16L 55/44; F16L 2101/10; F16L 2101/12
USPC ............ 30/103, 105; 15/104.3, 104.5, 104.9, 15/104.095, 104.31
See application file for complete search history.

(56) References Cited

U.S. PATENT DOCUMENTS 2,062,850 A * 12/1936 Weaver .................. B08B 9/047
15/104.31
2,604,521 A * 7/1952 Boucher ............... G01M 3/005
104/138.2

(Continued)

*Primary Examiner* — Phong H Nguyen
(74) *Attorney, Agent, or Firm* — Daniel J. Santos

(57) ABSTRACT

A cutter is provided for cutting through obstructions disposed in the interior of pipes ranging in size from approximately 8" to approximately 15" in diameter or from approximately 12" to approximately 24" in diameter. The cutter has been reduced in size relative to known root cutters to be capable of being used with smaller-diameter pipes, but is sufficiently powerful to cut through obstructions, such as mineral deposits, for example, that known flexible cutters capable of being used with these smaller-diameter pipes are incapable of cutting through.

20 Claims, 16 Drawing Sheets

(56) References Cited

U.S. PATENT DOCUMENTS

| | | | |
|---|---|---|---|
| 3,243,879 A * | 4/1966 | Gill | B23D 21/14 |
| | | | 30/103 |
| 4,516,286 A | 5/1985 | Crane | |
| 4,766,631 A * | 8/1988 | Crane | E03F 9/00 |
| | | | 15/104.12 |
| 4,773,115 A | 9/1988 | Smith | |
| 5,068,940 A | 12/1991 | Sheppard et al. | |
| 5,129,957 A | 7/1992 | Sheppard et al. | |
| 5,341,539 A | 8/1994 | Sheppard et al. | |
| 7,456,959 B2 | 11/2008 | Nakayama et al. | |
| 7,505,063 B1 * | 3/2009 | Bastedo | B08B 9/043 |
| | | | 15/104.05 |
| 7,526,827 B1 * | 5/2009 | Bitterman | B08B 9/047 |
| | | | 15/104.09 |
| 8,365,336 B2 * | 2/2013 | Morris | B08B 9/0436 |
| | | | 15/104.31 |
| 2014/0165870 A1 * | 6/2014 | Bichler | F16L 55/179 |
| | | | 104/138.2 |
| 2019/0314875 A1 | 10/2019 | Lendi | |

* cited by examiner

CUTTER CAPABLE OF CUTTING AWAY OBSTRUCTIONS DISPOSED ON THE INSIDES OF PIPES RANGING IN DIAMETER FROM APPROXIMATELY EIGHT INCHES TO APPROXIMATELY FIFTEEN INCHES OR FROM APPROXIMATELY TWELVE INCHES TO APPROXIMATELY TWENTY-FOUR INCHES

CROSS-REFERENCE TO RELATED APPLICATIONS

This application is a nonprovisional application that claims priority to and the benefit of the filing date of a U.S. provisional application having application Ser. No. 62/808,142, filed on Feb. 20, 2019, entitled "A CUTTER CAPABLE OF CUTTING AWAY OBSTRUCTIONS DISPOSED ON THE INSIDES OF PIPES RANGING IN DIAMETER FROM APPROXIMATELY EIGHT INCHES TO APPROXIMATELY FIFTEEN INCHES OR FROM APPROXIMATELY TWELVE INCHES TO APPROXIMATELY TWENTY-FOUR INCHES," which is hereby incorporated by reference herein in its entirety.

TECHNICAL FIELD

The invention relates to cutters for cutting through obstructions disposed inside of pipes.

BACKGROUND

Sewer pipes transport liquid and solid waste materials from residential, industrial, commercial and other waste producers. Sewer pipes can become clogged from the infiltration of various materials into the interior space of the pipes, such as sand, greasy materials, stones, tree roots, and buildup of other materials that settle out of the waste stream.

Hydraulic root cutters are tools that are commonly used to cut through tree roots and other obstructions that protrude into the interior spaces of pipes and can degrade the structural integrity of the pipes. Because root cutters are typically designed to cut through tree roots, they are not always powerful enough to cut through particular types of obstructions, such as particular types of mineral deposits (e.g., calcium deposits).

Hydraulic root cutters come in a variety of configurations, but generally include a device mounted on skids and pushed through the sewer pipe using a hydraulic motor, using high pressure water for rotating and cutting to clean the pipe. Such a cutter is disclosed in, for example, U.S. Pat. No. 4,766,631, entitled "Sewer Pipeline Hydraulic Root Cutter Apparatus" that issued Aug. 30, 1988 and U.S. Pat. No. 4,516,286, entitled "Sewer Pipeline Cleaning Apparatus" that issued May 14, 1985. It is also known to provide rotating brushes or cutters driven by an electric motor for moving through a pipe for cleaning, as disclosed in, for example, U.S. Pat. No. 4,773,115, entitled "Sewer Cleaning Device" that issued Sep. 27, 1988.

It is also known to provide a bullet-shaped cleaning head with rearward facing water jet nozzles. Water under high pressure (e.g., 2000 pounds per square inch (psi)), exits the rearward-facing nozzles to propel the cleaning head forward to break up obstructions in the pipe and to wash solid material from the walls of the pipe, as disclosed in, for example, U.S. Pat. No. 5,341,539, entitled "Apparatus for Cleaning Waste Collection System" that issued Aug. 30, 1994, in U.S. Pat. No. 5,336,333, entitled "Method for Cleaning Waste Collection Systems" that issued Aug. 9, 1994, in U.S. Pat. No. 5,129,957, entitled "Method for Cleaning Sewers" that issued Jul. 14, 1992, and in U.S. Pat. No. 5,068,940, entitled "Apparatus for Cleaning Sewers" that issued Dec. 3, 1991.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
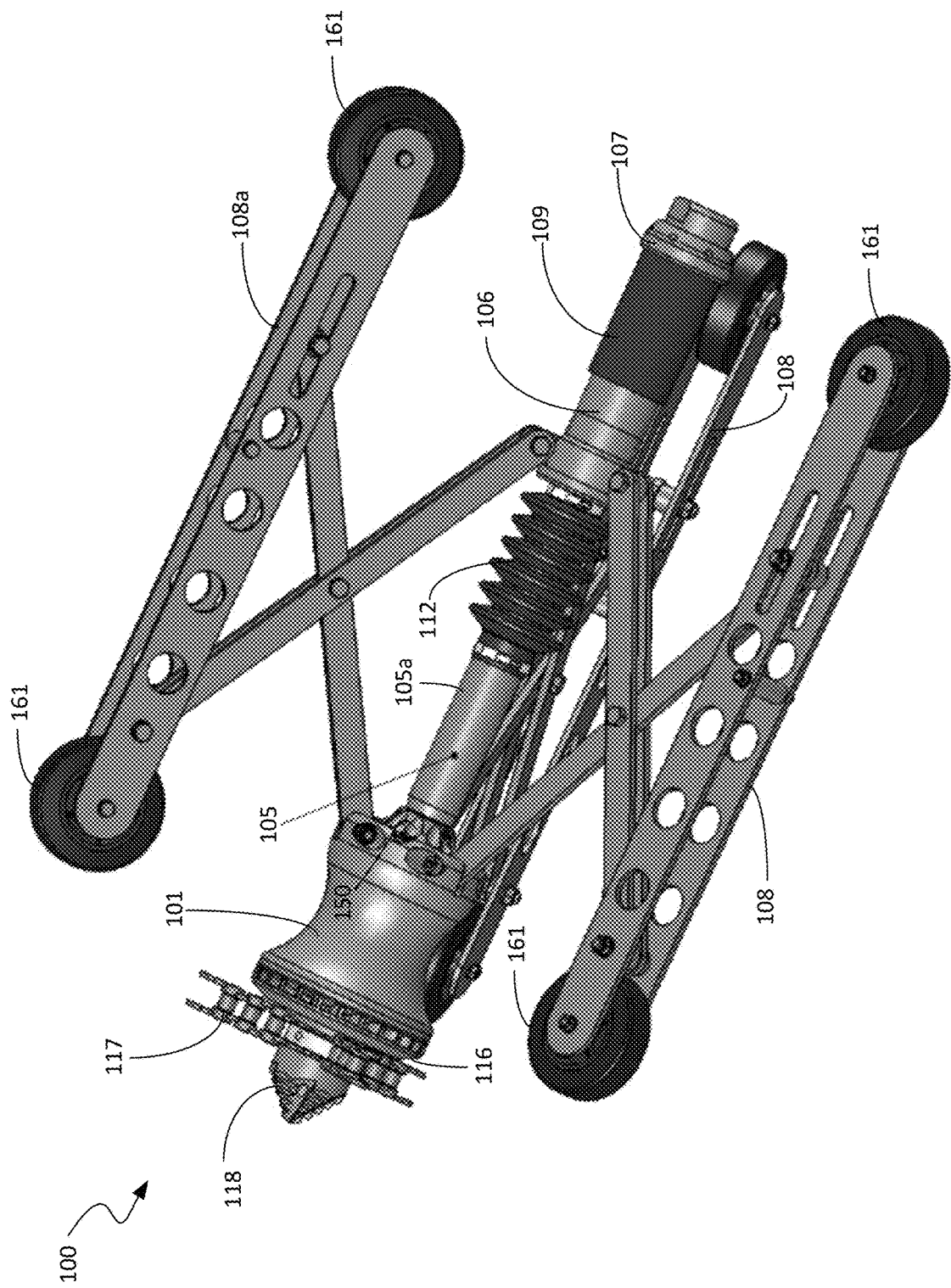
FIG. 1 is a perspective view of the cutter in accordance with a representative embodiment.

The present disclosure discloses a cutter for cutting through obstructions disposed in the interior of pipes ranging in size from approximately 8" to approximately 15" in diameter or from approximately 12" to approximately 24" in diameter. In accordance with embodiments disclosed herein, a cutter is provided that has been reduced in size relative to known root cutters to be capable of being used with smaller-diameter pipes, but is designed and configured to be sufficiently powerful to cut through obstructions that existing flexible cutters that are capable of being used with the smaller-diameter pipes are unable to cut through, such as mineral deposits, for example.

In the following detailed description, a few exemplary, or representative, embodiments are described to demonstrate the inventive principles and concepts. For purposes of explanation and not limitation, the representative embodiments disclosing specific details are set forth in order to provide a thorough understanding of an embodiment according to the present disclosure. However, it will be apparent to one having ordinary skill in the art having the benefit of the present disclosure that other embodiments that depart from the specific details disclosed herein remain within the scope of the appended claims. Moreover, descriptions of well-known apparatuses and methods may be omitted to avoid obscuring the description of the representative embodiments. Such methods and apparatuses are clearly within the scope of the present teachings, as will be understood by those of skill in the art.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "coupled with" another element or component, it can be directly connected or coupled, or intervening elements may be present, unless the element is referred to as being "directly connected to," "directly coupled to," or "directly coupled with" the other element or component.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

In accordance with one representative embodiment, the cutter is designed to cut through obstructions disposed in the interior of pipes ranging in size from approximately 8" to approximately 15". In accordance with another representative embodiment, the cutter is designed to cut through obstructions disposed in the interior of pipes ranging in size from approximately 12" to approximately 24". Because these cutters are generally identical except for scale and motor size, the cutters will be described with reference to a single set of drawings.

In order to achieve a design and physical implementation for the cutters that allowed them to be used with these smaller-diameter pipes while also being sufficiently powerful to cut through mineral deposits and other very hard obstructions, it was necessary to design components for the cutters and coupling arrangements for the components that allowed the smaller cutters to withstand increased vibrations and other impacts associated with the higher output power of the smaller cutters needed to cut through obstructions such as mineral deposits, for example. The combination of components and features that allowed the cutter to achieve these and other goals are described below with reference to a representative embodiment. It should be noted, however, that components other than those described below may be used to construct the cutters, as will be understood by those of skill in the art in view of the description being provided herein. For example, fastening devices and coupling elements shown in the figures and discussed below can be replaced with other suitable fastening devices and coupling elements.

Figure 2:
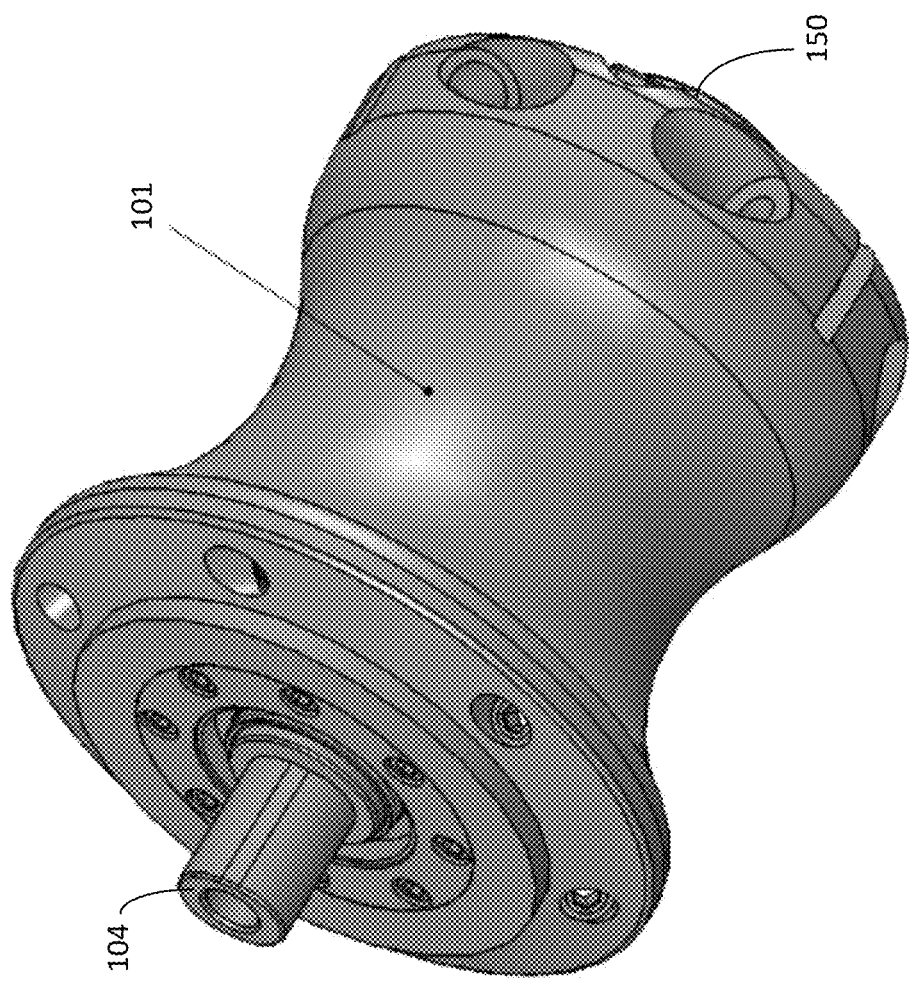
FIG. 2 is a perspective view of the main body of the cutter shown in FIG. 1 in accordance with a representative embodiment.
Figure 3:
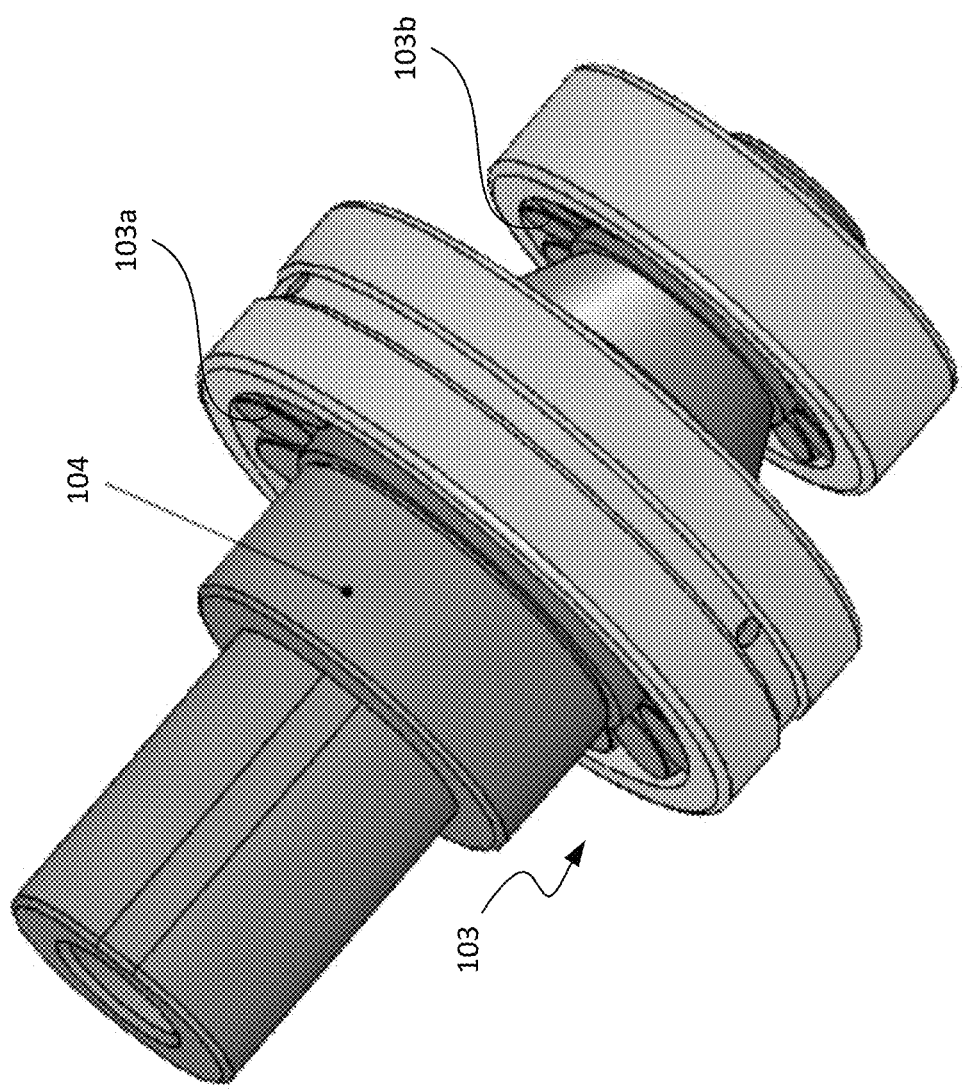
FIG. 3 is a perspective view of a roller bearing assembly and shaft of the cutter shown in FIG. 1 in accordance with a representative embodiment.
Figure 4:
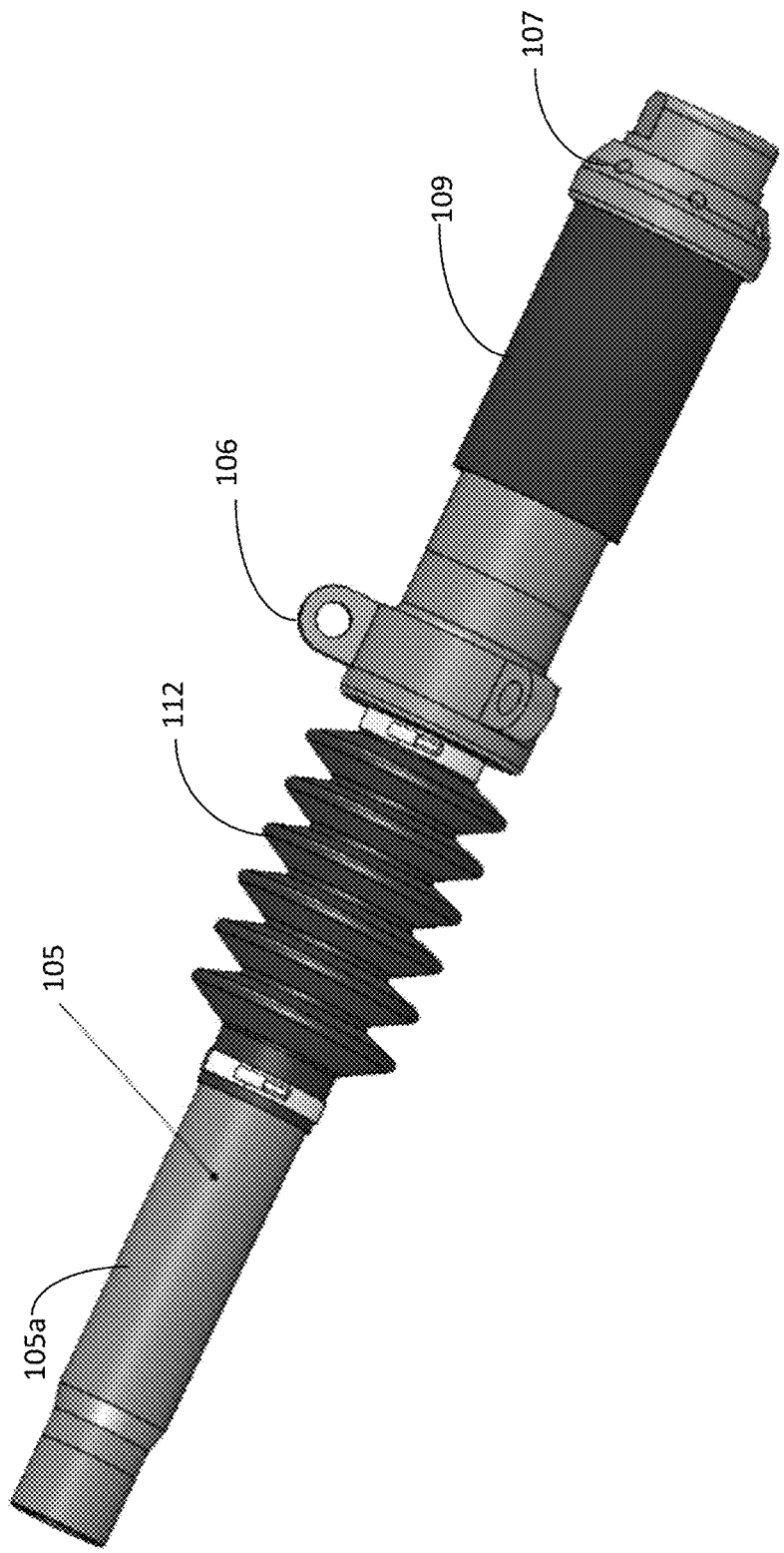
FIG. 4 is a perspective view of a pipe assembly of the cutter shown in FIG. 1 comprising a skid holder and an adjusting spindle coupled in accordance with a representative embodiment.
Figure 5:
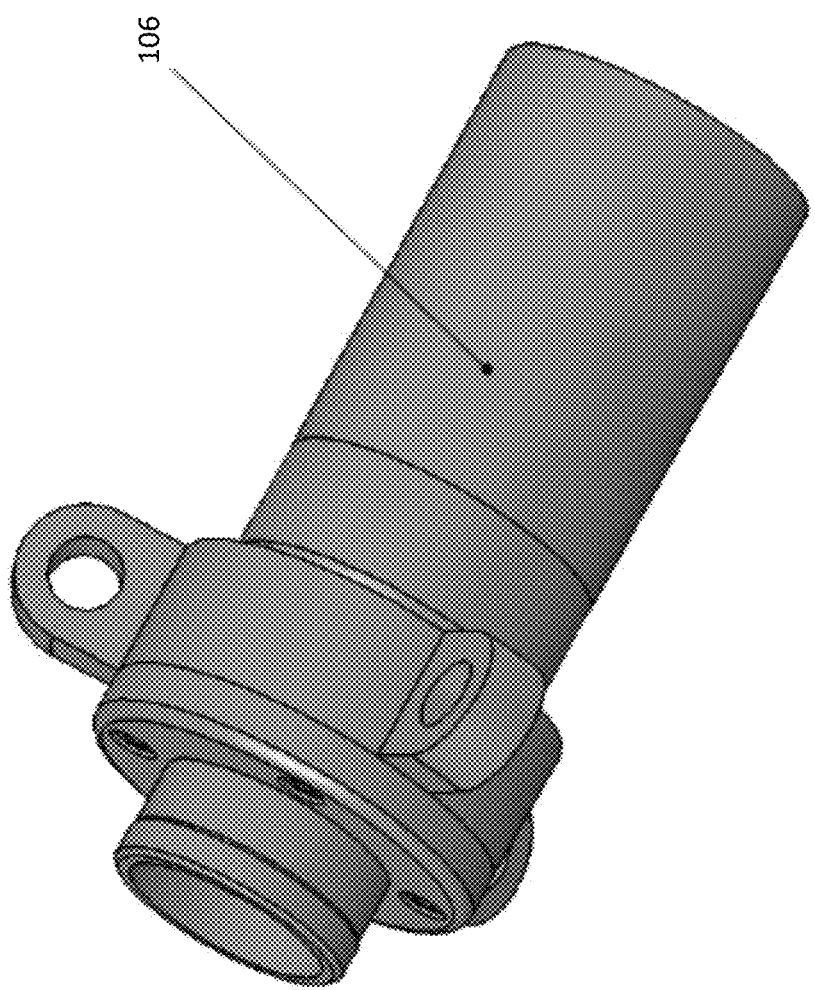
FIG. 5 is a perspective view of the skid holder shown in FIG. 4 in accordance with a representative embodiment.
Figure 6:
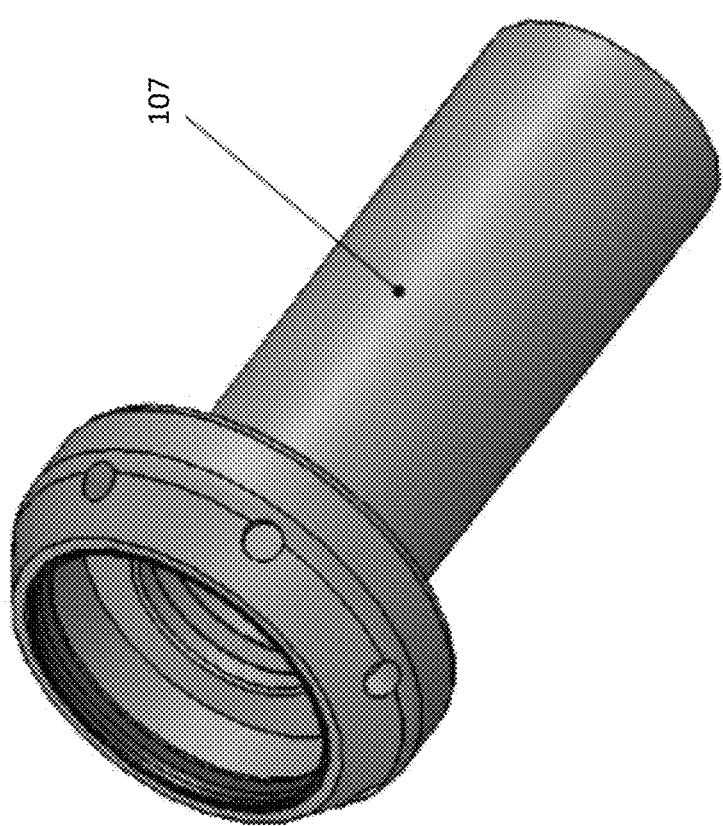
FIG. 6 is a perspective view of the adjusting spindle shown in FIG. 4 in accordance with a representative embodiment.
Figure 7:
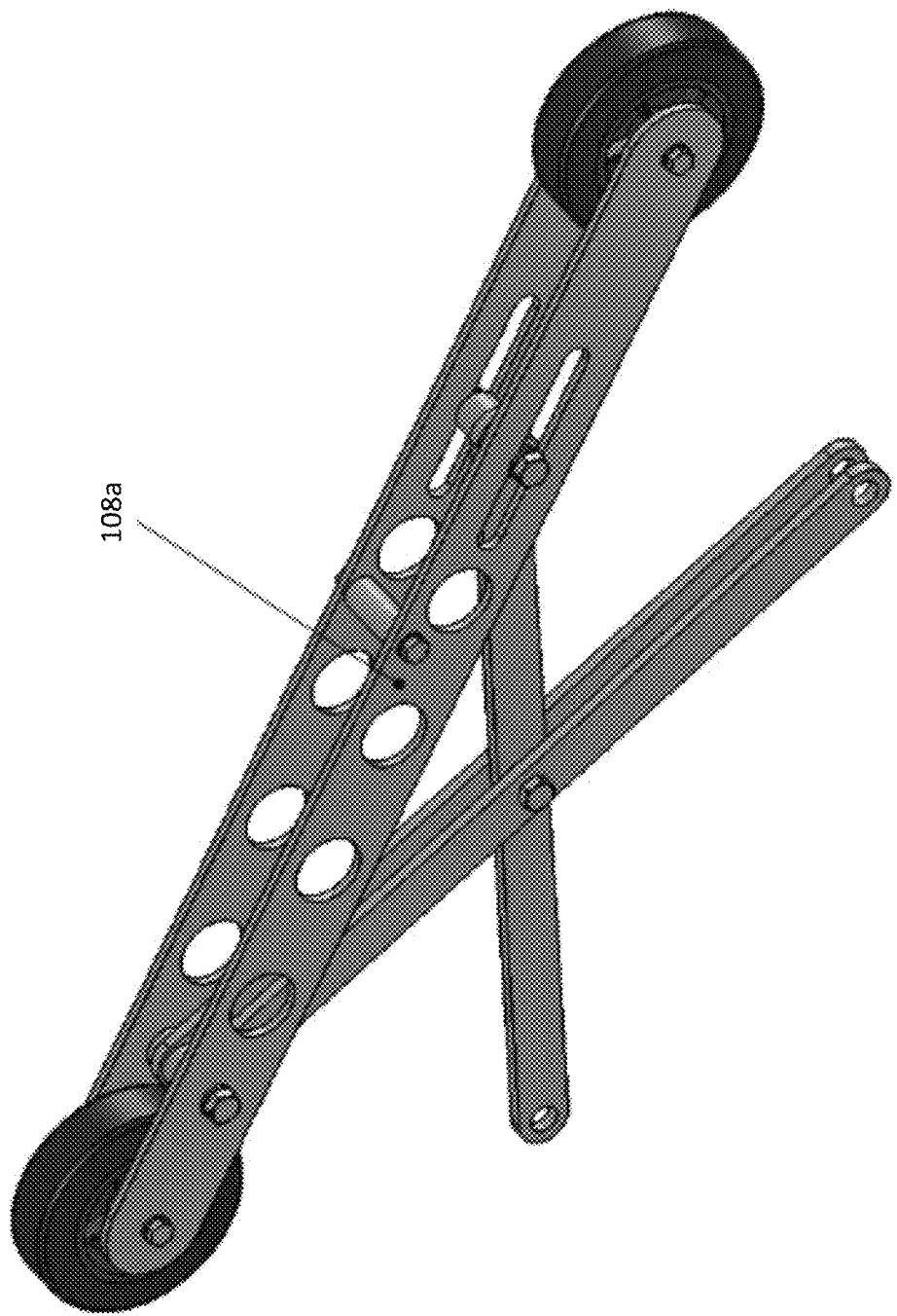
FIG. 7 is a perspective view of one of the adjustable skids of the adjustable skid assembly of the cutter shown in FIG. 1 in accordance with a representative embodiment.
Figure 8:
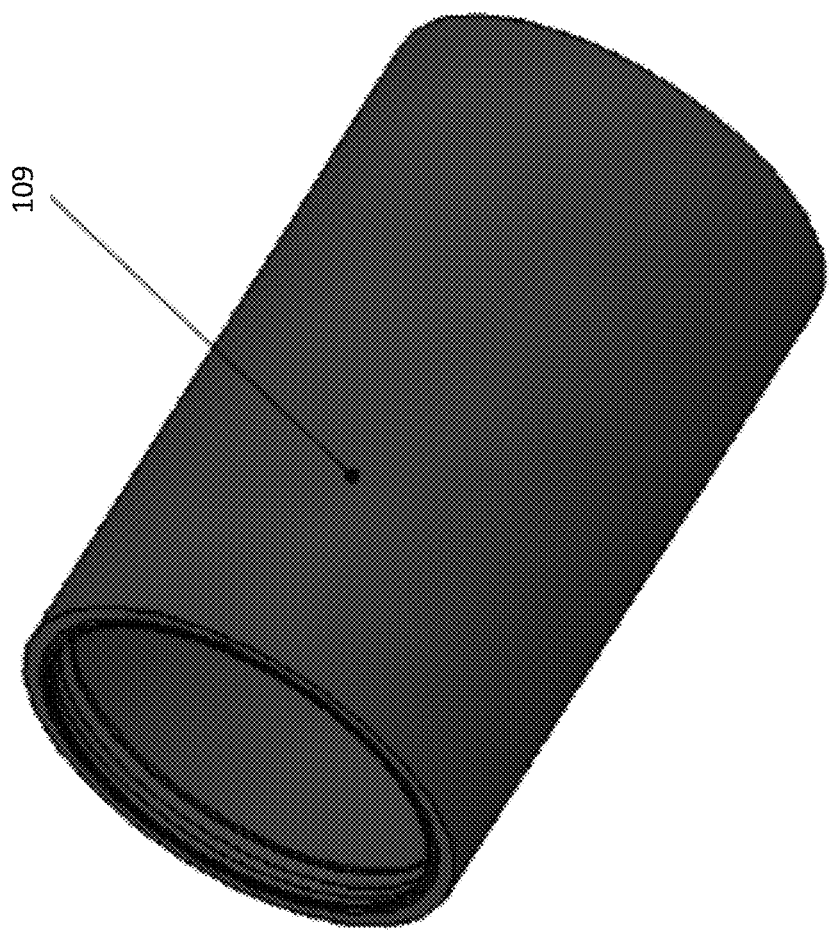
FIG. 8 is a perspective view of a cover that couples to the pipe assembly of the cutter shown in FIG. 1 in accordance with a representative embodiment.

FIG. 1 is a perspective view of the cutter 100 in accordance with a representative embodiment. FIG. 2 is a perspective view of the main body 101 of the cutter 100 shown in FIG. 1 in accordance with a representative embodiment. FIG. 3 is a perspective view of a roller bearing assembly 103 and shaft 104 of the cutter 100 shown in FIG. 1 in accordance with a representative embodiment. FIG. 4 is a perspective view of a pipe assembly 105 of the cutter 100 shown in FIG. 1 comprising a skid holder 106 and an adjusting spindle 107 in accordance with a representative embodiment. FIG. 5 is a perspective view of the skid holder 106 shown in FIG. 4 in accordance with a representative embodiment. FIG. 6 is a perspective view of the adjusting spindle 107 shown in FIG. 4 in accordance with a representative embodiment. FIG. 7 is a perspective view of one of the adjustable skids 108a of the adjustable skid assembly 180 of the cutter 100 shown in FIG. 1 in accordance with a representative embodiment. FIG. 8 is a perspective view of a cover 109 of the pipe assembly 105 of the cutter 100 shown in FIG. 1 that couples to the pipe 105a of the pipe assembly 105 in accordance with a representative embodiment.

Figure 9:
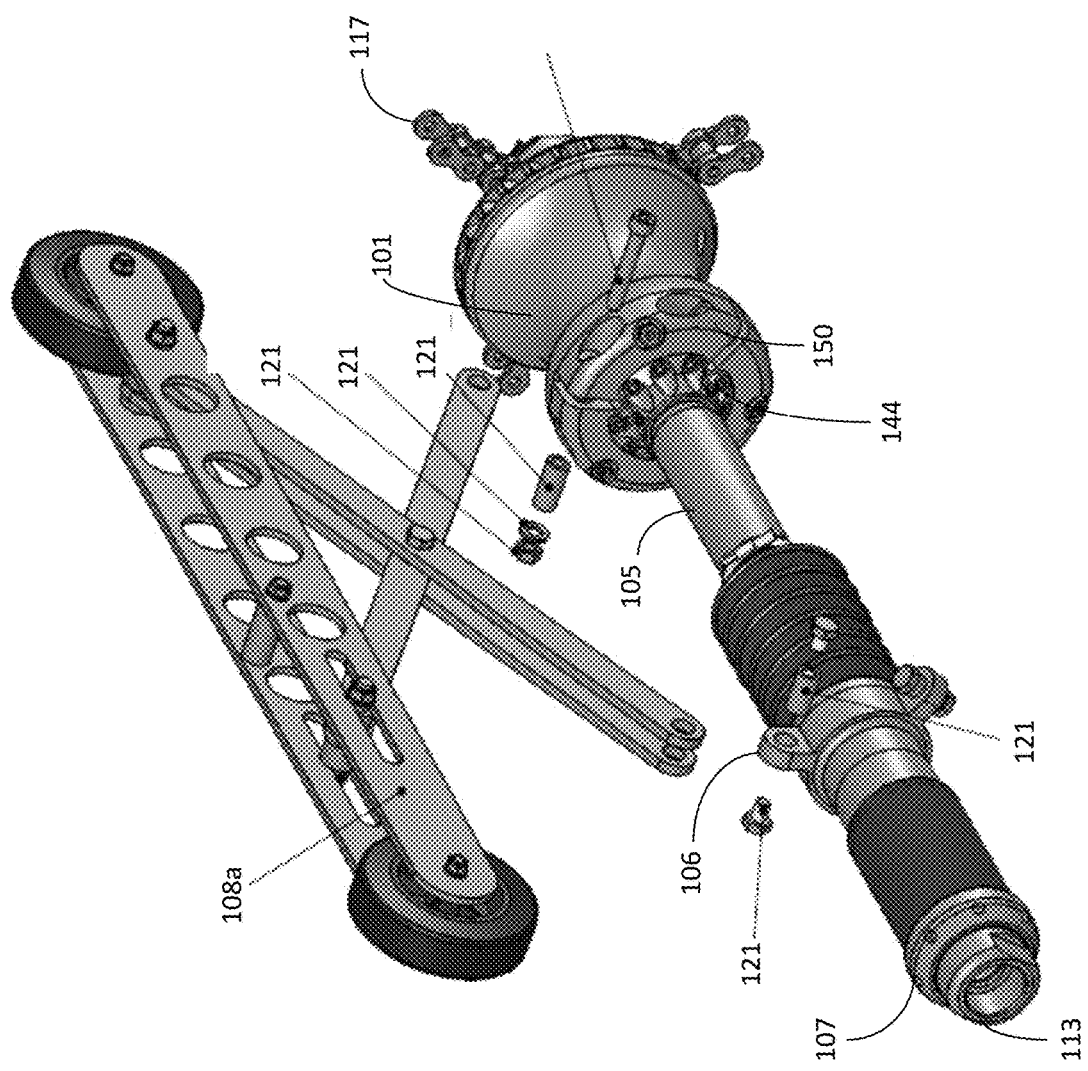
FIG. 9 is a perspective view of the cutter shown in FIG. 1 showing the manner in which one of the adjustable skids is coupled to the skid holder and to the main body of the cutter using various fastening devices in accordance with a representative embodiment.
Figure 10:
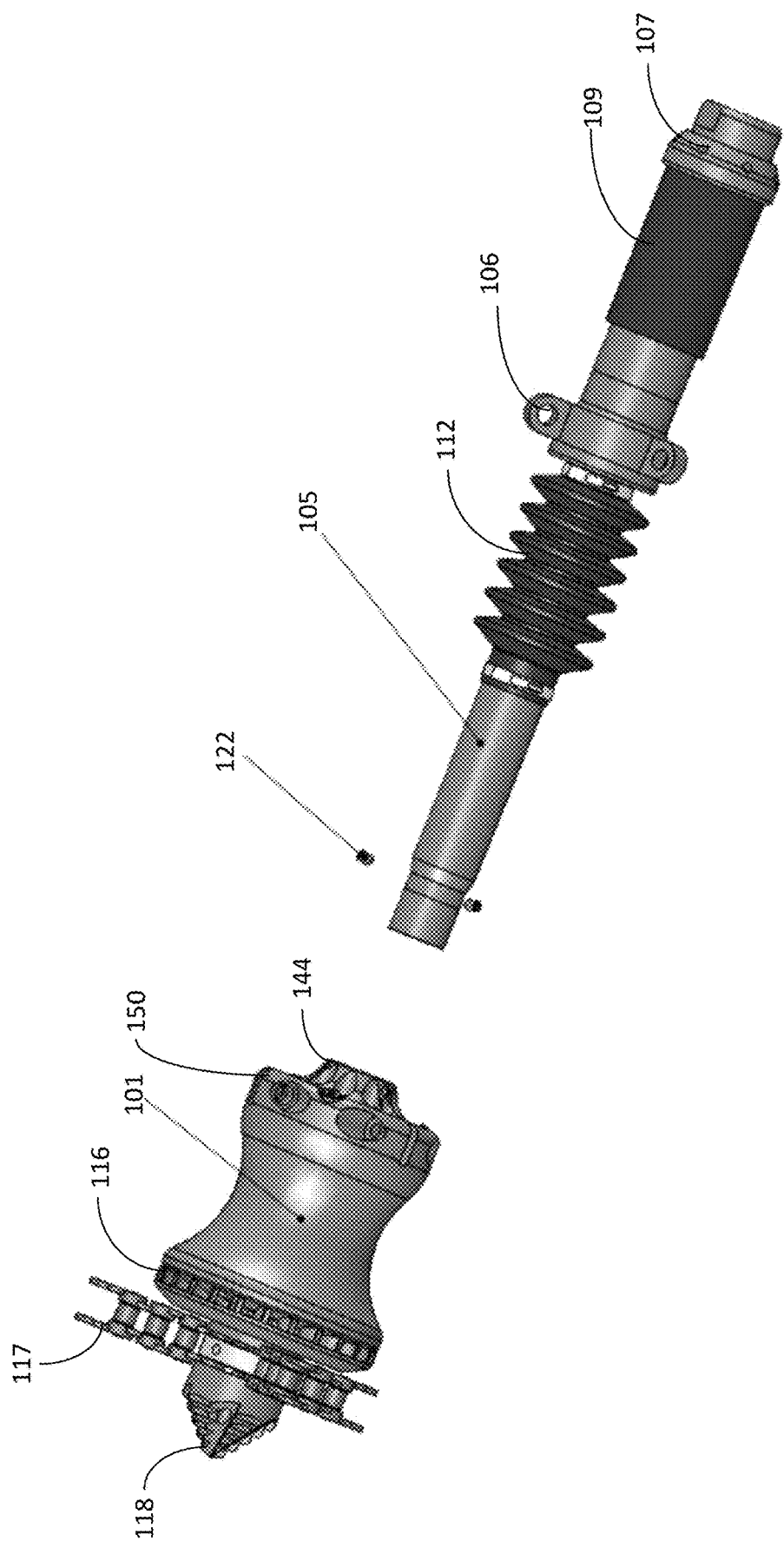
FIG. 10 is a perspective view of the pipe assembly and the main body of the cutter shown in FIG. 1 and shows the manner in which fastening devices may be used for coupling the pipe assembly to the main body in accordance with a representative embodiment.
Figure 11:
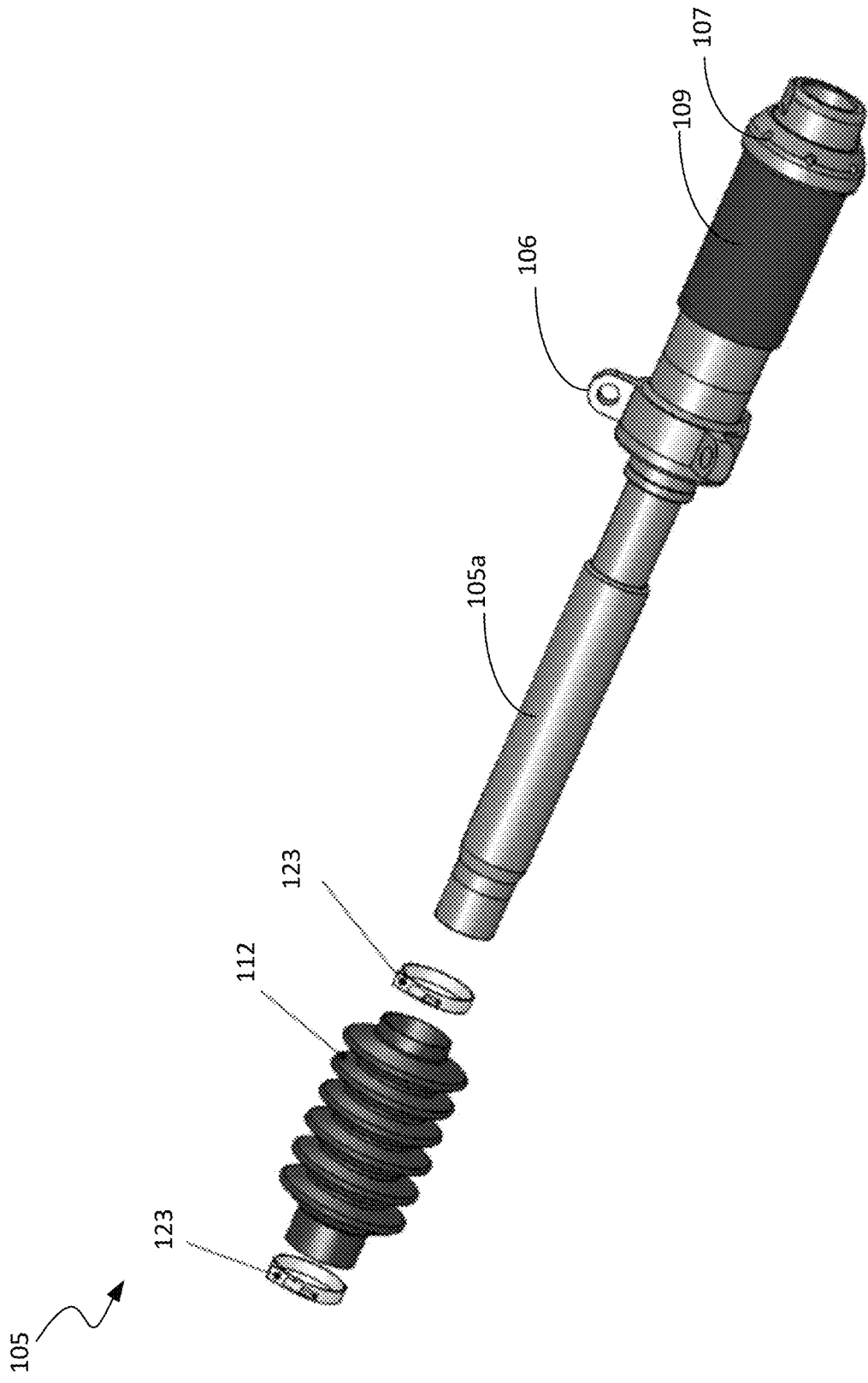
FIG. 11 is a perspective view of a rubber bellow of the pipe assembly of the cutter shown in FIG. 1 and shows the manner in which fastening devices may be used for coupling the rubber bellow to the pipe of the pipe assembly in accordance with a representative embodiment.
Figure 12:
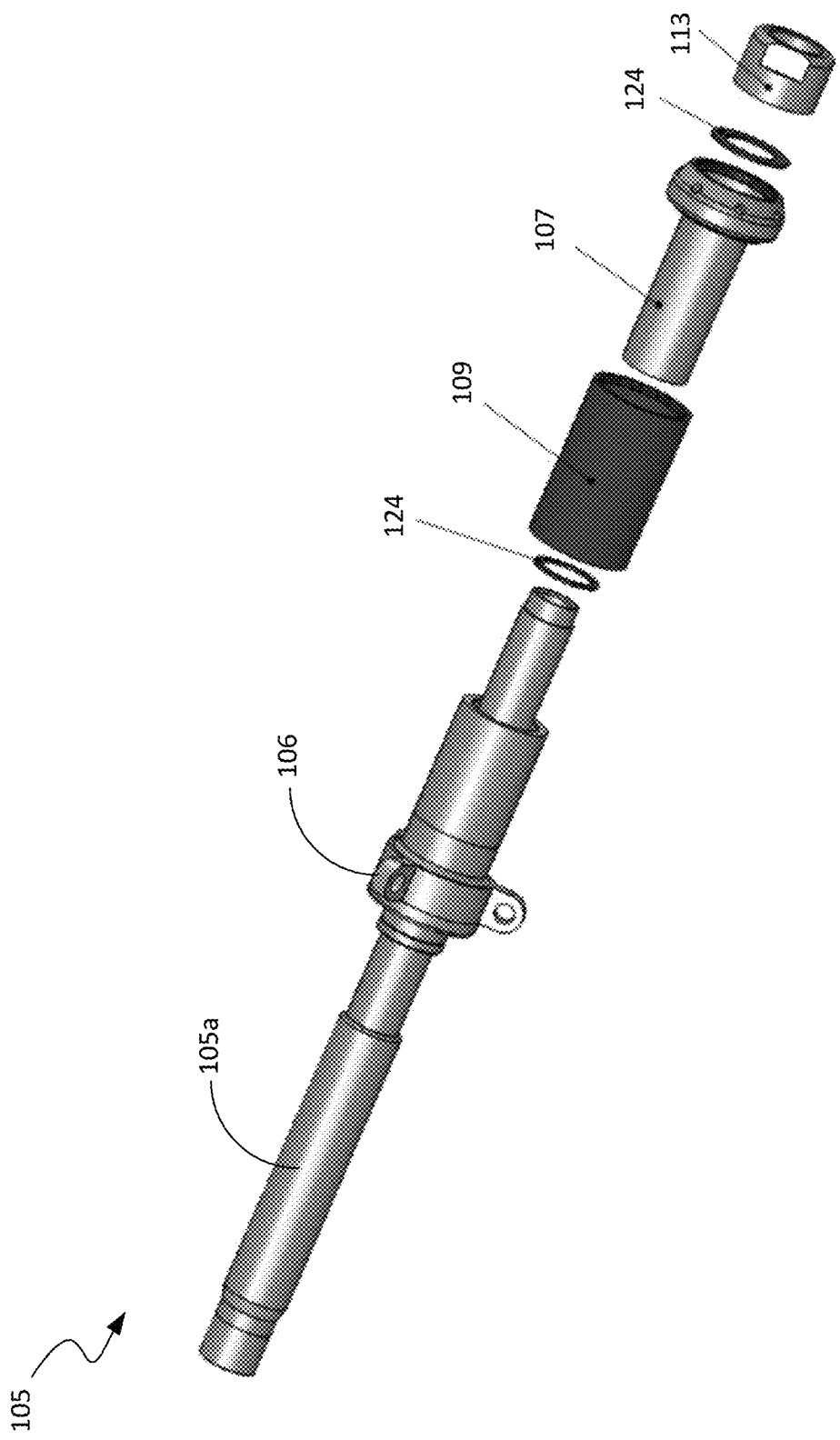
FIG. 12 is a perspective view of the pipe assembly of the cutter shown in FIG. 1 and shows the manner in which the cover, the adjusting spindle, a hose connection and seals may be coupled together and to the pipe of the pipe assembly in accordance with a representative embodiment.
Figure 13:
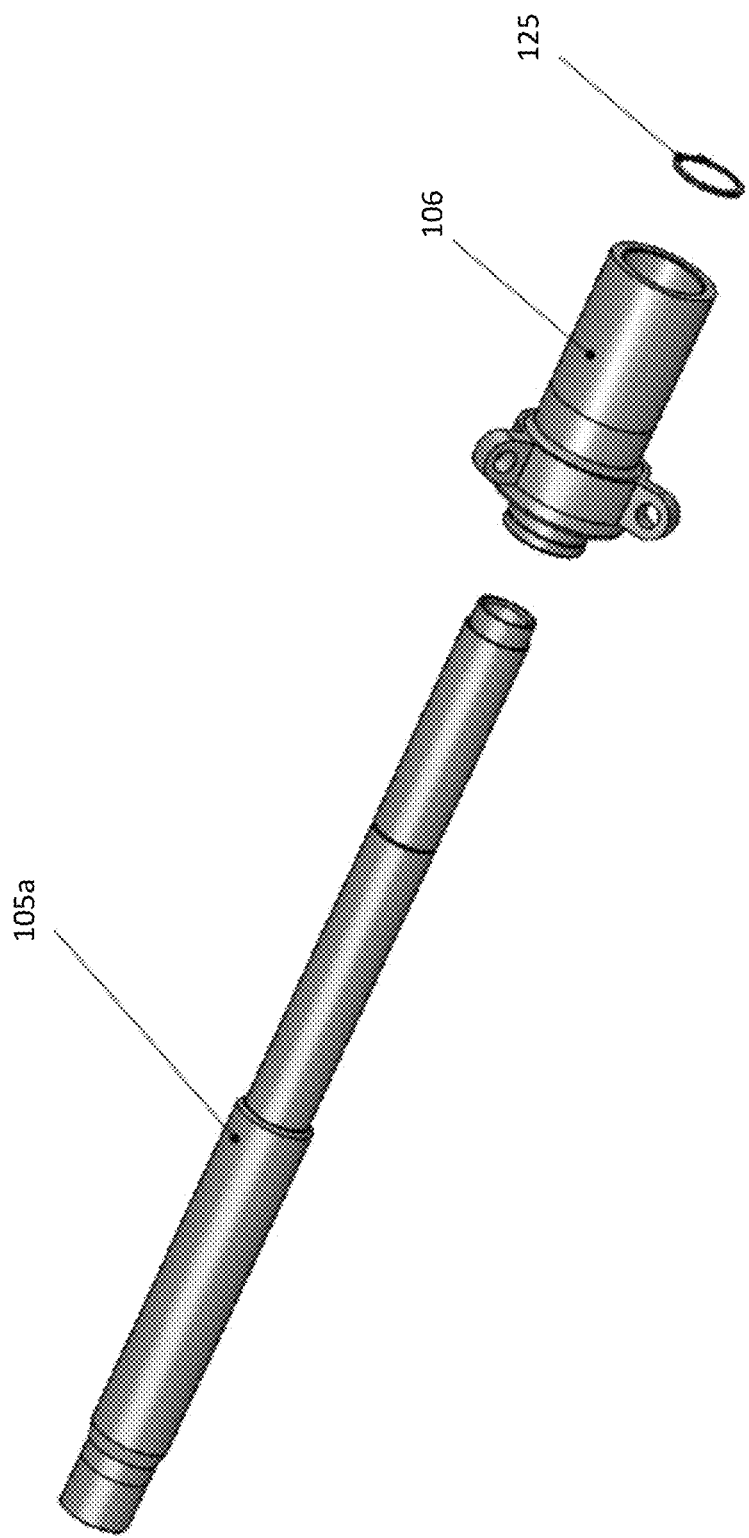
FIG. 13 is a perspective view of the skid holder and the pipe of the pipe assembly of the cutter shown in FIG. 1 and shows the manner in which they are coupled together along with a seal in accordance with a representative embodiment.

FIG. 9 is a perspective view of the cutter 100 shown in FIG. 1 showing the manner in which one of the adjustable skids 108a is coupled to the skid holder 106 and to the main body 101 of the cutter 100 using various fastening devices 121 in accordance with a representative embodiment. FIG. 10 is a perspective view of the pipe assembly 105 and the main body 101 of the cutter shown in FIG. 1 and shows the manner in which fastening devices 122 may be used to couple the pipe assembly 105 with the main body 101 in accordance with a representative embodiment. FIG. 11 is a perspective view of a rubber bellow 112 of the pipe assembly 105 of the cutter 101 shown in FIG. 1 and shows the manner in which fastening devices 123 may be used to couple the rubber bellow 112 with the pipe 105*a* of the pipe assembly 105 in accordance with a representative embodiment. FIG. 12 is a perspective view of the pipe assembly 105 of the cutter 100 shown in FIG. 1 and shows the manner in which the cover 109, the adjusting spindle 107, a hose connection 113 and seals 124 may be coupled together and to the pipe 105*a* of the pipe assembly 105 in accordance with a representative embodiment. FIG. 13 is a perspective view of the skid holder 106 and the pipe 105*a* and shows the manner in which they are coupled together along with a seal 125 in accordance with a representative embodiment.

Figure 14:
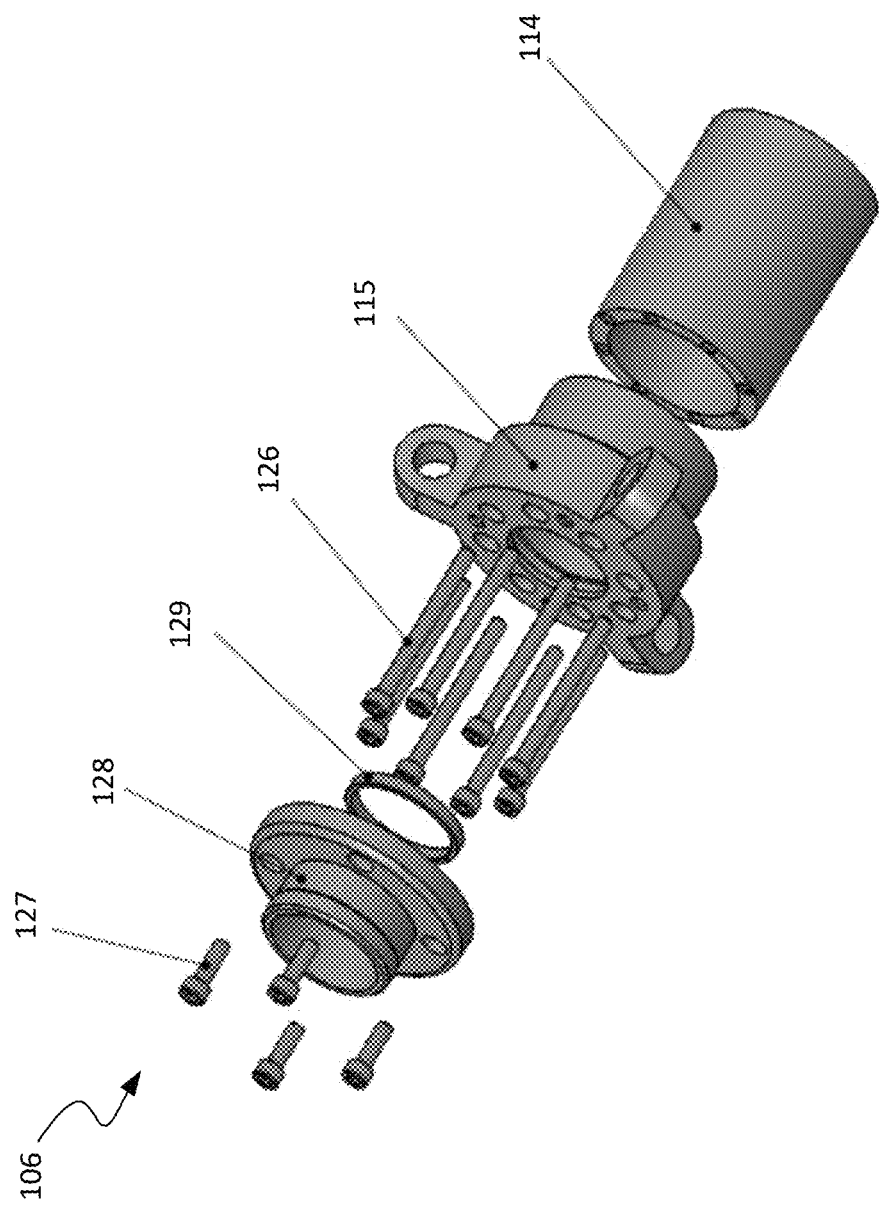
FIG. 14 is an exploded perspective view of a threaded block of the skid holder shown in FIG. 13 in accordance with a representative embodiment and shows the manner in which various fastening devices can be used to couple components of the skid holder together with a seal interposed in between some of the components in accordance with a representative embodiment.
Figure 15:
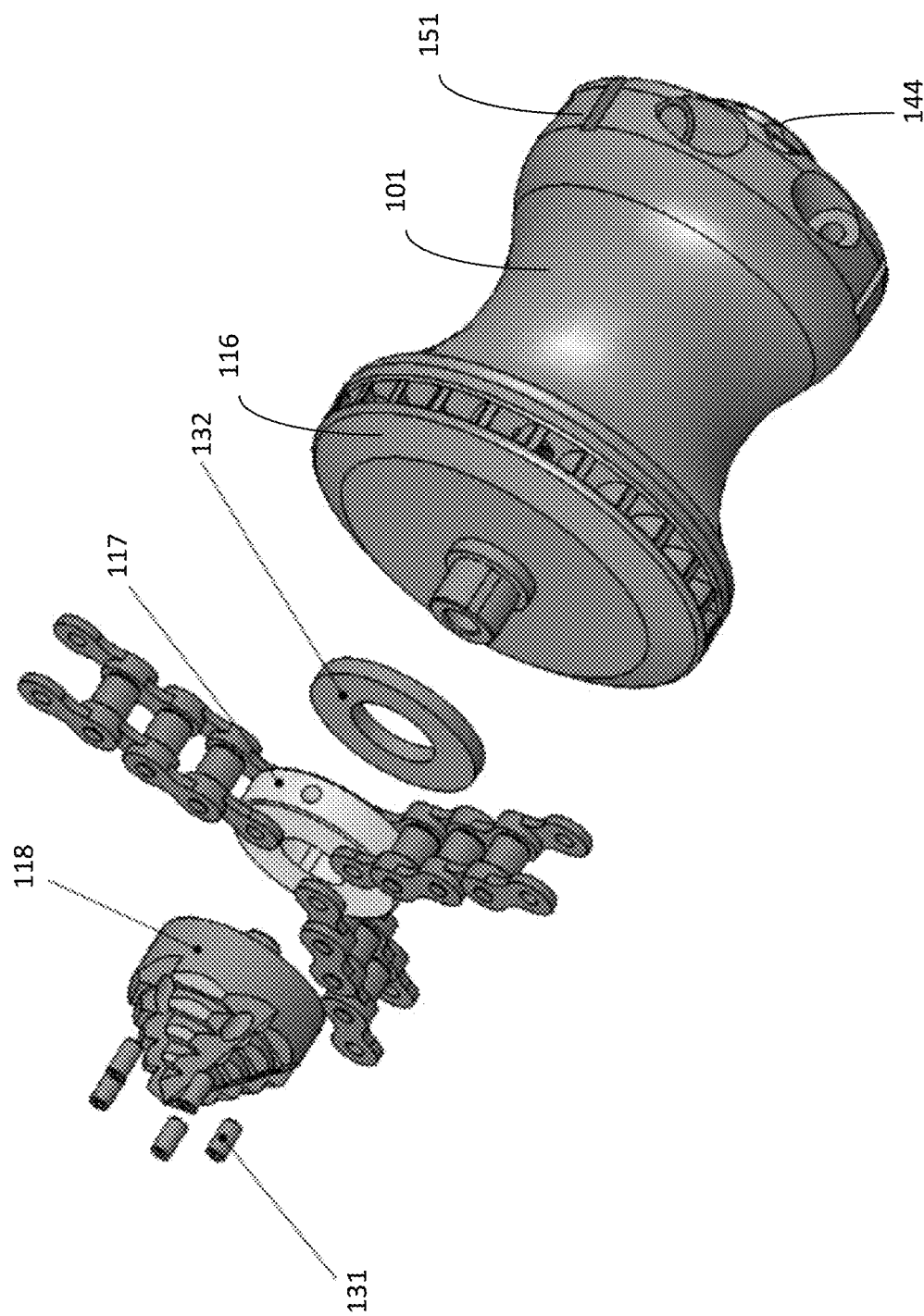
FIG. 15 is an exploded perspective view of the main body of the cutter shown in FIG. 1 comprising a turbine having a chain assembly and a bit coupled thereto in accordance with a representative embodiment.
Figure 16:
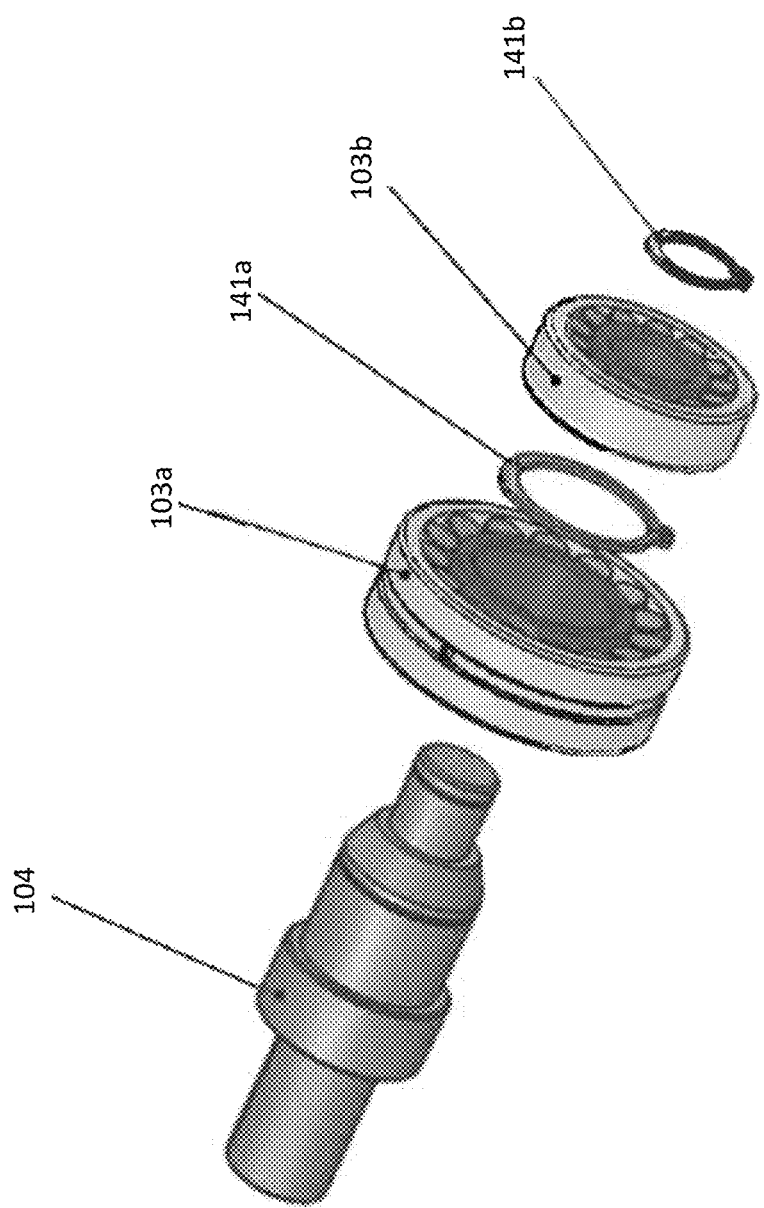
FIG. 16 is an exploded perspective view of the roller bearings and shaft shown in FIG. 3 along with two different sized retainer rings for retaining the roller bearings in their respective positions on the shaft.

FIG. 14 is an exploded perspective view of a threaded block 115 of the skid holder 106 shown in FIG. 13 and shows the manner in which various fastening devices 126 and 127 can be used to couple components 114, 115 and 128 of the skid holder 106 together with a seal 129 interposed in between components 115 and 128 in accordance with a representative embodiment. FIG. 15 is an exploded perspective view of the main body 101 of the cutter 100 shown in FIG. 1 and shows the manner in which a turbine 116, a chain assembly 117 and a bit 118 can be coupled together using various fastening devices 131 and 132 in accordance with a representative embodiment. FIG. 16 is an exploded perspective view of the roller bearings 103*a* and 103*b* and shaft 104 shown in FIG. 3 and two different sized retainer rings 141*a* and 141*b* for retaining the roller bearings 103*a* and 103*b* in their respective positions on the shaft 104.

In accordance with the representative embodiment depicted in FIGS. 1-16, the cutter 100 is a flexible chain cutter engineered to be powerful, durable, user friendly and low maintenance. In accordance with an embodiment, the cutter 100 is made of tempered stainless steel and aluminum, although the cutter 100 may be made of any suitable materials. In accordance with an embodiment, the cutter 100 uses turbine engine technology in combination with three-dimensional (3-D) fluid mechanics to deliver cutting performance that is not achievable using known root cutters available in the market in the same operating range. The cutter 100 is capable of, but not limited to, cutting through roots, grease, mineral deposits and protruding taps. The cutter 100 is not limited with regard to the materials it is used to cut through or with regard to pipes or surfaces with which it is used.

The flexible guide skid assembly 108 is adjustable between 8"-15" with increments of ⅟₁₆", making it capable of handling offsets in the pipe. In accordance with another representative embodiment, the flexible guide skid assembly 108 is adjustable between 12"-24" with increments of ⅟₁₆", making it capable of handling offsets in the pipe. The skid assembly 108 is a typically skid assembly of the type used with cutters sold by the assignee of the present application. The skid assembly 108 can be adjusted outwardly and inwardly to fit the inner diameter of the pipe and then locked at a desired width. Once disposed inside of the pipe to be cleaned, the rollers 161 (FIG. 1) come into contact with the inner surface of the pipe to allow the cutter 100 to roll along the inner surface of the pipe as it is propelled forward by the hydraulic propulsion unit 150 of the cutter 100.

During operations, water forced through the pipe assembly 105 into the propulsion unit enters the main body and is directed in multiple directions. In the propulsion unit 150, valves are formed through which water jets flow in the rearward direction. These jets contact the inner surface of the pipe or obstructions therein and propel the cutter 100 forward. Additionally, valves formed in the propulsion unit 150 also channel water jets forward to provide a cleaning effect on the inner surface of the pipe. Water flow channels inside of the main body also direct water entering the main body 101 onto the back side of the turbine 116, causing the turbine 116 to rotate at a very high rotational velocity. The causes the chain assembly 117, which typically comprises multiple, evenly-spaced lengths of chain links, to rotate at a very high rotational velocity. As the chain assembly 117 comes into contact with any obstructions disposed on the inner surface of the pipe, the combined impact of the chain links and the water jets on the obstructions cause them to be degraded or removed.

In accordance with an representative embodiment, the cutter 100 comprises one-piece ceramic inserts, a high-pressure swivel and is capable of being used with recycled water. The water hose (not shown) connects to the hose connection 113 (FIGS. 9 and 12), which mechanically couples to the adjusting spindle 107.

Although the cutter 100 is shown having the chain assembly 117 (FIGS. 1 and 9), the chain assembly 117 can be swapped out with other types of abrading, or cutting, assemblies (not shown) that are configured to be coupled to the turbine 116.

Known root cutters were initially developed to remove root growth in underground pipes. The development of known root cutters focused on user-friendly operation, compact lever action, high efficiency, and use of recycled water. Over time, the requirements of root cutters changed to include, in addition to roots, removal of ever more frequently encountered deposits, such as calcium mineral buildup, concrete and similar solids. The known root cutters that had been developed specifically for roots had reached their limits because they were not developed for this kind of new work.

The cutter 100 was developed to meet these challenges while retaining the beneficial characteristics of the earlier root cutters, such as those developed by the assignee of the present application. In addition, the cutter 100 was developed to work on pipes having diameters smaller than those with which earlier cutters were designed to be used. In addition to the cutter 100 being designed to operate on pipes having diameters ranging from 8" to 15" and from 12" to 24", the cutter 100 was designed to have a stronger drive motor for cutting through the aforementioned obstructions, to have greater stability, to have higher power output, to have increased resistance to abrasive and fine particles, to have improved resistance to vibrations, and to accommodate high lateral and axial forces. Prior to the development of the cutter 100, flexible chain cutters were not available that could be used with pipes having these smaller diameters and that were capable of cut through obstructions such as calcium mineral deposits.

When shattering calcium mineral and concrete deposits in conjunction with the use of recycled water, a kind of sludge is formed that can be very detrimental to the infinitely adjusting spindle 107. For this reason, additional sealing and isolation chambers were incorporated into the cutter 100 to separate this sludge from the spindle 107, thereby ensuring operability at all times. With reference to FIG. 14, the components 128, 129, 115 and 114 of the skid holder 106 couple with one another and with the adjusting spindle 107 in a way that provides these sealing and isolation chambers in the pipe assembly 105 for isolating the spindle 107 from sludge. In addition, the spindle 107 and other parts of the linkage are designed to be shielded from increased vibrations of the main body 101 when cutting through mineral and concrete deposits. In conventional root cutters designed strictly for root removal, this shielding is not needed. With reference to FIGS. 9 and 10, connector 144 that couples the pipe assembly 105 with the propulsion unit 150 shields the spindle 107 from these increased vibrations.

In contrast to known root cutters, in accordance with an embodiment, the portion of the main body 101 that houses the drive motor and the portion that houses the propulsion unit 150 are manufactured as separate components and then secured to one another. This provides the main body 101 with greater strength and stability. The connector 144 couples the pipe assembly 105 with the propulsion unit 150 and provides a very strong connection between the propulsion unit 150 and the pipe assembly 105. This allows the power rating of the propulsion unit 150 to be increased several fold while retaining the desired pipe diameter application range to provide greater force and increased torque. Moreover, the weight of the cutter 100 and the location of its center of gravity are selected to achieve improved balance and stability.

The additional forces and impact on the main body 101 are accommodated through careful selection of the drive unit within the main body 101 and through the use of front and back roller bearings assemblies 103a and 103b, respectively. The combination of these components allows high radial forces and high axial forces to be absorbed by the main body 101. With reference to FIG. 16, each of the roller bearing assemblies 103a and 103b comprises multiple sets of roller bearings. For example, in accordance with an embodiment, the front roller bearing assembly 103a comprises a front array of roller bearings and back array of roller bearings. Likewise, the back roller bearing assembly 103a comprises a front array of roller bearings and back array of roller bearings. This combined roller bearing configuration allows the cutter 100 to operate with high output power while absorbing the high radial and axial forces that occur during operations. It should be noted, however, that a single roller bearing assembly having one or more sets of roller bearings could be used in the main body 101 or multiple roller bearing assemblies, each having at least one set of roller bearings, may be used in the main body 101.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while a particular configuration of the cutter 100 is described herein and shown in the figures, a variety of other configurations may be used, as will be understood by those skilled in the art in view of the description provided herein. Many modifications may be made to the embodiments described herein while still achieving the goals of the invention, and all such modifications are within the scope of the invention.

What is claimed is:

1. A cutter for removing obstructions including mineral deposits and concrete deposits from pipes, the cutter comprising:
   a main body that serves as a drive housing;
   a turbine coupled to a shaft on a front end of the main body;
   a cutting assembly mechanically coupled to the turbine;
   a propulsion unit disposed at a back end of the main body opposite the turbine;
   a pipe assembly having a first end that is mechanically coupled to the propulsion unit and a second end that is mechanically coupled to a first end of an adjusting spindle;
   a hose fitting mechanically coupled to a second end of the adjusting spindle, the hose fitting being adapted to connect with a hose for supplying a washing liquid to the cutter; and
   an adjustable skid assembly mechanically coupled to the cutter, the adjustable skid assembly being adjustable to movingly engage inner surfaces of pipes having diameters ranging from approximately eight inches to approximately fifteen inches or from approximately twelve inches to approximately twenty-four inches, and wherein components of the skid holder couple with one another and with the adjusting spindle in a way that provides sealing and isolation chambers in the pipe assembly, wherein the sealing and isolation chambers prevent sludge from entering the adjusting spindle.

2. The cutter of claim 1, wherein the cutting assembly is a chain assembly comprising one or more lengths of chain link.

3. The cutter of claim 1, wherein the propulsion unit and the main body are manufactured as separate parts and subsequently secured together.

4. The cutter of claim 1, wherein the propulsion unit is installed in the main body at the back end of the main body such that the main body serves as a drive housing and as a housing for the propulsion unit.

5. The cutter of claim 1, wherein the first end of the pipe assembly is mechanically coupled to the propulsion unit by a connector that shields the adjusting spindle from at least some vibrations of the main body that occur when the cutter is in use.

6. The cutter of claim 1, wherein the shaft is coupled with at least a first roller bearing assembly inside of the main body, the first roller bearing assembly comprising at least a first set of roller bearings that come into contact with the shaft.

7. The cutter of claim 6, wherein the first roller bearing assembly further comprises at least a second set of roller bearings adjacent the first set of roller bearings.

8. The cutter of claim 1, wherein the shaft is coupled with at least first and second roller bearing assemblies inside of the main body, the first and second roller bearing assemblies each comprising at least a first set of roller bearings that come into contact with the shaft.

9. The cutter of claim 8, wherein the first roller bearing assembly further comprises at least a second set of roller bearings adjacent the first set of roller bearings.

10. The cutter of claim 9, wherein the second roller bearing assembly further comprises at least a second set of roller bearings adjacent the first set of roller bearings of the second roller bearing assembly.

11. A method for removing obstructions including mineral deposits and concrete deposits from pipes, the method comprising:
   adjusting an adjustable skid assembly mechanically coupled to a cutter to movingly engage an inner surface of a pipe having either a diameter ranging from approximately eight inches to approximately fifteen inches or from approximately twelve inches to approximately twenty-four inches, the cutter comprising:
   a main body that serves as a drive housing;
   a turbine coupled to a shaft on a front end of the main body;
   a cutting assembly mechanically coupled to the turbine;

a propulsion unit disposed at a back end of the main body opposite the turbine;

a pipe assembly having a first end that is mechanically coupled to the propulsion unit and a second end that is mechanically coupled to a first end of an adjusting spindle; and a hose fitting mechanically coupled to a second end of the adjusting spindle;

and with a hose connected to the adjusting spindle, suppling a washing liquid to the cutter, wherein the washing liquid enters the propulsion unit and the main body of the cutter is directed through liquid flow channels of the propulsion unit and of the main body, wherein at least some of the washing fluid directed through the liquid flow channels is directed by the propulsion unit in a rearward direction and in a forward direction onto the inner surface of the pipe, and wherein at least some of the washing liquid is directed onto a back side of the turbine causing the turbine to rotate, and wherein components of the skid holder couple with one another and with the adjusting spindle in a way that provides sealing and isolation chambers in the pipe assembly, wherein the sealing and isolation chambers prevent sludge from entering the adjusting spindle.

12. The method of claim 11, wherein the cutting assembly is a chain assembly comprising one or more lengths of chain link.

13. The method of claim 11, wherein the propulsion unit and the main body are manufactured as separate parts and subsequently secured together.

14. The method of claim 11, wherein the propulsion unit is installed in the main body at the back end of the main body such that the main body serves as a drive housing and as a housing for the propulsion unit.

15. The method of claim 11, wherein the first end of the pipe assembly is mechanically coupled to the propulsion unit by a connector that shields the adjusting spindle from at least some vibrations of the main body that occur when the cutter is in use.

16. The method of claim 11, wherein the shaft is coupled with at least a first roller bearing assembly inside of the main body, the first roller bearing assembly comprising at least a first set of roller bearings that come into contact with the shaft.

17. The method of claim 16, wherein the first roller bearing assembly further comprises at least a second set of roller bearings adjacent the first set of roller bearings.

18. The method of claim 11, wherein the shaft is coupled with at least first and second roller bearing assemblies inside of the main body, the first and second roller bearing assemblies each comprising at least a first set of roller bearings that come into contact with the shaft.

19. The method of claim 18, wherein the first roller bearing assembly further comprises at least a second set of roller bearings adjacent the first set of roller bearings.

20. The method of claim 19, wherein the second roller bearing assembly further comprises at least a second set of roller bearings adjacent the first set of roller bearings of the second roller bearing assembly.

\* \* \* \* \*